United States Patent [19]
Janneck et al.

[11] 3,753,712
[45] Aug. 21, 1973

[54] METHOD OF MAKING DIFFUSION DEVICES HAVING A MEMBRANE SUPPORT OF PHOTOINSOLUBILIZED PLASTIC

[75] Inventors: Howard A. Janneck, Chicago; F. Jesus Martinez, Palatine; George W. Schnitzius, Park Ridge, all of Ill.

[73] Assignee: Baxter Laboratories, Inc., Morton Grove, Ill.

[22] Filed: Nov. 23, 1970

[21] Appl. No.: 92,102

[52] U.S. Cl.......................... 96/38.2, 210/321, 156/2
[51] Int. Cl............................................. B01d 31/00
[58] Field of Search.................... 210/22, 23, 321, 210/5 W; 96/84, 38.2; 156/2

[56] References Cited
UNITED STATES PATENTS
3,210,187 10/1965 Thommes ........................... 96/84 X
3,537,588 11/1970 Backer ............................... 210/321
3,077,268 2/1963 Gobel et al. ....................... 210/321

*Primary Examiner*—Frank A. Spear, Jr.
*Attorney*—W. Garrettson Ellis and Barry L. Clark

[57] ABSTRACT

Mass transfer diffusion devices, such as artificial kidneys and membrane oxygenators, are provided having a membrane support which comprises a supporting layer made from photoinsolubilized plastic. The supporting layer defines a plurality of projections of uniform height to support the membrane and to define fluid flow channels of uniform depth between the projections. The membrane support is fabricated by overlaying a photoinsolubilizable plastic layer with a master transparency having transparent and opaque areas disposed in a predetermined arrangement, passing light or other radiation through the transparency to insolubilize appropriate portions of the plastic layer, and then washing away the remaining soluble portions of the plastic layer.

8 Claims, 12 Drawing Figures

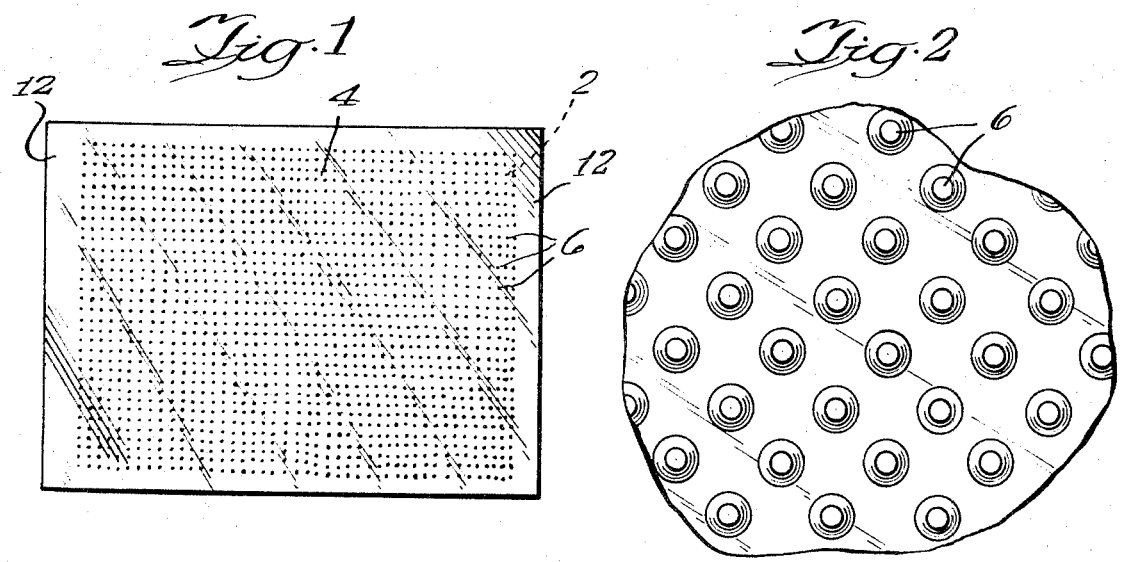
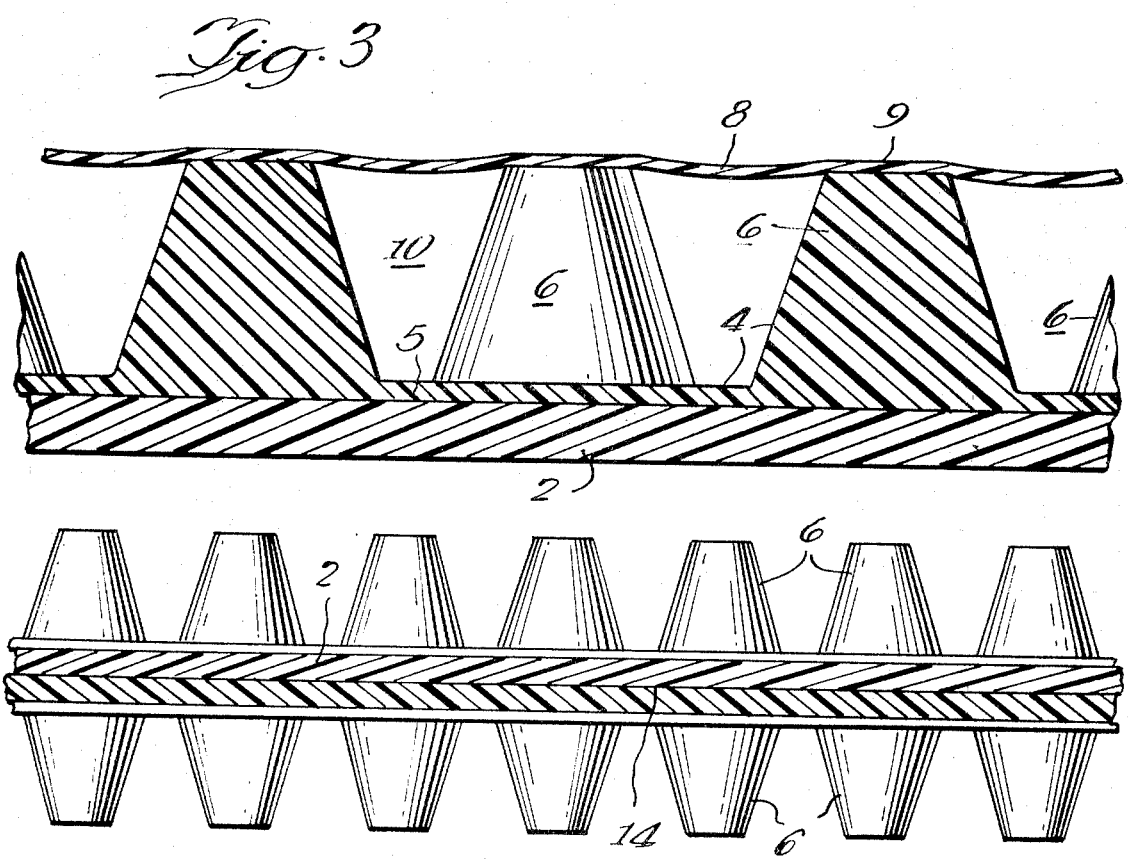

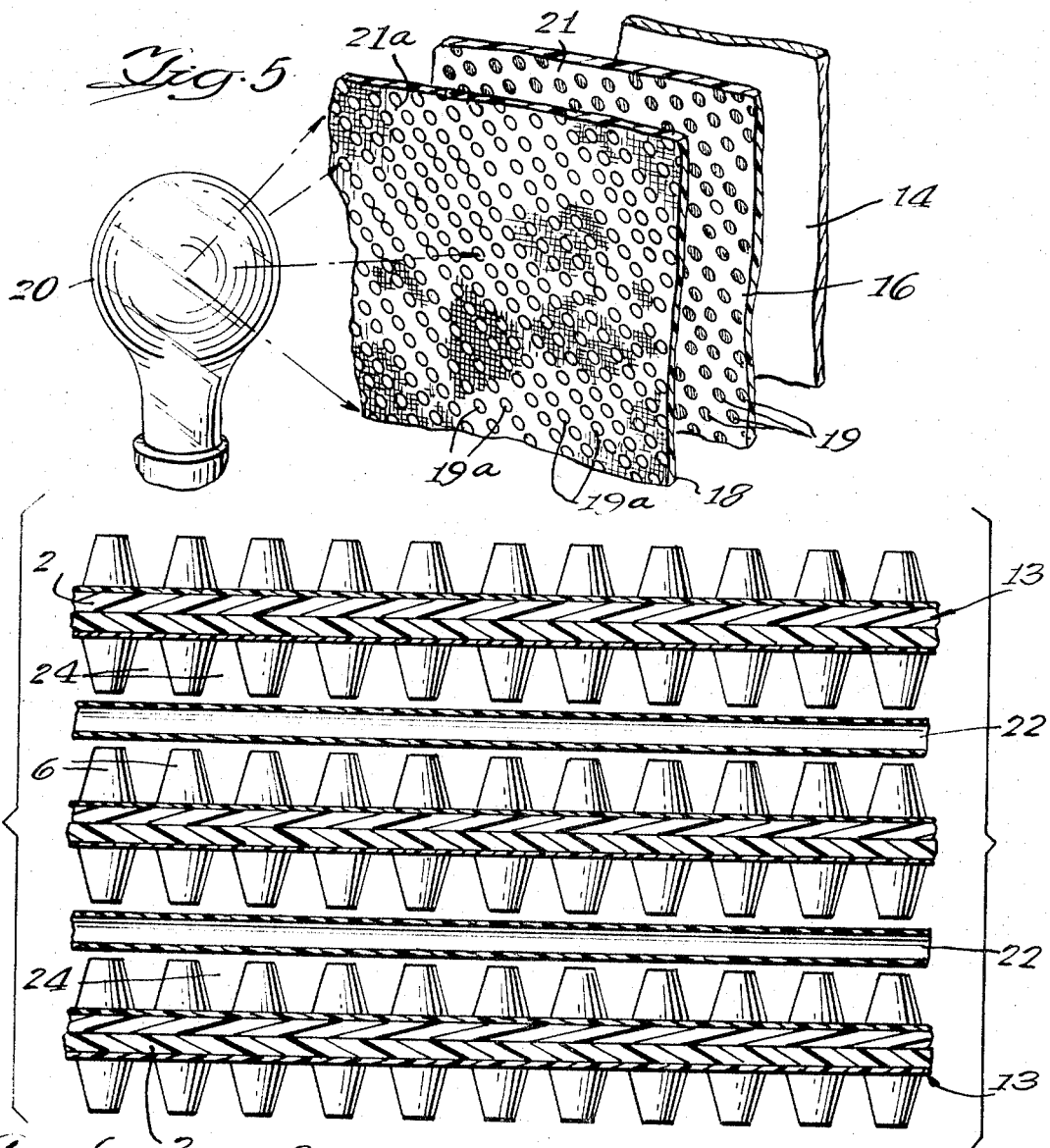

INVENTORS
Howard A. Janneck
J. Jesus Martinez
George W. Schnitzius

BY W. Garretson Ellis
ATTORNEY

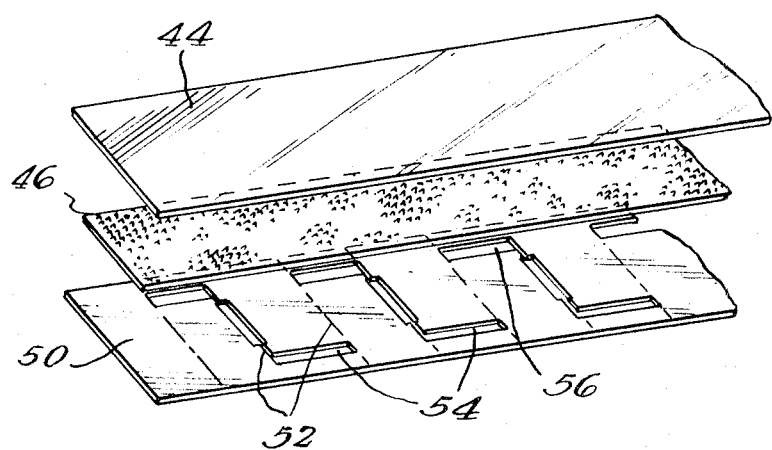
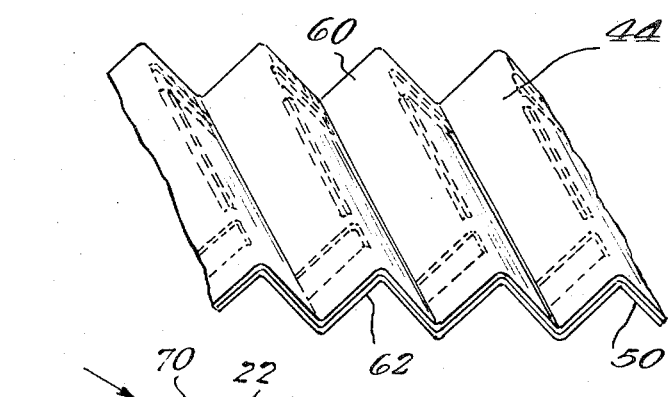
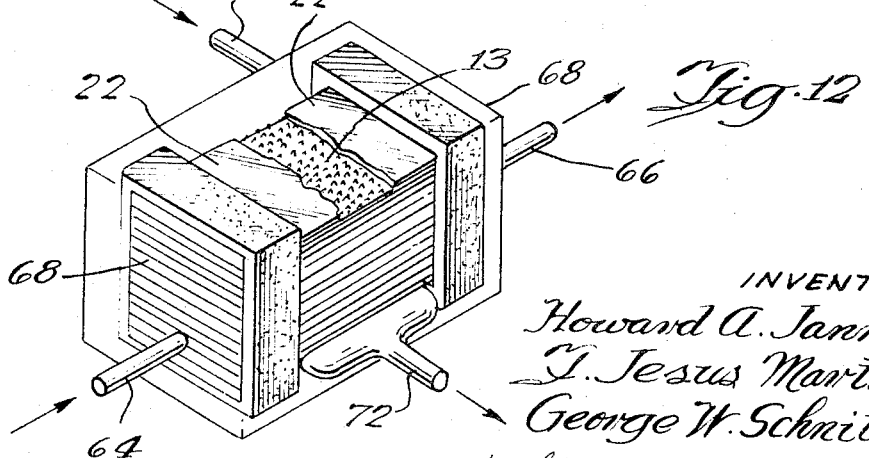

3,753,712

METHOD OF MAKING DIFFUSION DEVICES HAVING A MEMBRANE SUPPORT OF PHOTOINSOLUBILIZED PLASTIC

BACKGROUND OF THE INVENTION

Mass transfer diffusion devices are used to selectively remove or introduce specific materials (generally of low molecular weight) to a mixture by placing the mixture in contact with one side of a semipermeable membrane while passing a fluid across the other side of the membrane. Depending on the constituency of the mixture and the fluid on respective sides of the membrane, there can be a migration of low molecular weight materials through the membrane in either direction.

Devices incorporating this principle are used in the chemical process area as well as in the medical field. In the medical field, artifical kidneys utilizing a semipermeable diffusion membrane for mass transfer are commercially available, and a substantial number of designs of devices for blood oxygenation using the same principle have also been developed.

The semipermeable membrane typically requires a membrane support which holds the membrane in position and protects it from rupture. It has been suggested, for example, in U.S. Pat. Nos. 3,077,268 and 3,362,540, that molded or milled plates having a number of cone-shaped elements projecting therefrom are advantageous for use as membrane supports in mass transfer devices. However, the plates which are thus far available have projections of nonuniform height for supporting the membrane. In some instances the designers have intentionally provided projections of nonuniform height, but generally the molding or milling processes used to manufacture membrane supports have resulted in height variations between the projections of about 2 mils or more. When the projections on a membrane support plate are as nonuniform as this, the flow paths defined between the projections and the plate and the overlying membrane are of sufficiently variable cross-sectional dimension to cause a tendency of preferential flow of fluid through the larger flow channels. This, in turn, results in a deficiency of fluid in the areas adjacent the smaller flow channels. As a result of this, an inefficient mass transfer will take place, since it will not be possible to optimize fluid flow volumes and velocities over all points of the diffusion membrane overlying such a molded or milled membrane support.

It is particularly important to provide an extremely close tolerance in the projection height because desirable projection heights are on the order of 15 to 50 mils.

In the case in which conical projections are used, it is often desirable for there to be approximately 500 to 1,000 of such projections per square inch on the membrane support. The problem of making a mold for such membrane supports having a tolerance which is substantially less than about 2 mils is extremely difficult and perhaps impossible, and involves an immense expense. Furthermore, in production, as the mold wears, the height and shape of the membrane supports will vary undesirably. Similarly, it is extremely difficult, if not impossible, to mill such complex structures to the required close tolerances.

The mass transfer devices of this invention utilize membrane supports in which the projection height can be essentially uniform, varying by no more than about one-half mil, and the other dimensions of the projections are also extremely uniform. As a result, the mass transfer devices of this invention are capable of providing a highly uniform series of flow channels adjacent a diffusion membrane due to the extreme uniformity of the height and other dimensions of the projections in the membrane support used herein. Also, the membrane supports of this invention are capable of being quickly and easily reproduced in very large quantities with essentially no deviation in dimensions from one support to the next. Hence, mass transfer devices can be fabricated from a plurality of membrane supports in which all of the projections present are of identical dimension, which presents the opportunity for providing commercial quantities of multiple flow path mass transfer devices in which each flow path is of constant configuration with each other flow path, which provides the opportunity to perform mass transfer under optimum conditions of fluid flow.

DESCRIPTION OF THE INVENTION

In accordance with this invention, a mass transfer device is provided in which a diffusion membrane overlies a membrane support, which support comprises a supporting layer made of photoinsolubilized plastic. The supporting layer defines a plurality of projections of uniform height to support the membrane and to define fluid-flow channels of uniform depth between the projections.

Typically, the projections are uniformly distributed, upstanding protrusions having a height of from 0.005 inch to 0.08 inch, and covering from 5 percent to 30 percent of the area of the membrane support, with from 30 to 5,000 of the protrusions per square inch of area of the membrane support. Preferably, the protrusions are in the shape of truncated cones, although they can also desirably be ridges or veins running parallel across the face of the membrane support.

It is particularly preferred, in terms of achieving optimum fluid-flow characteristics for mass transfer across a membrane, for truncated cone protrusions used to be from 0.015 to 0.03 inch high, there being from 600 to 900 of the protrusions per square inch of area of the membrane support. The protrusions preferably cover from about 5 percent to 2 percent of the area of the membrane support.

The protrusions of the supporting layer can be carried on a flexible plastic or a rigid backing layer. Examples of such backing layers are plastic layers such as cellophane, biaxially oriented polyethylene terephthalate, vinyl, or polystyrene. Examples of nonplastic material, rigid or flexible, are metal sheeting or foils, cardboard, and the like. Alternatively, the photoinsolubilized plastic itself can be of sufficient thickness to provide its own backing layer for the upstanding protrusions on its surface.

The mass transfer devices of this invention can be fabricated by preparing a photoinsolubilizable plastic layer having a uniform thickness in any conventional manner, i.e., allowing the liquid plastic to settle on a flat surface by gravity until a uniform upper surface is achieved, or extruding a film of the photoinsolubilizable plastic material onto a backing and wiping smooth with a precision blade or roller of predetermined height, or the like. It is within the scope of the prior art to produce layers of plastic having essentially planar upper surfaces with a height variation of about 0.5 mil.

Following the above, the photoinsolubilizable plastic layer is overlaid with a master transparency, usually prepared photographically, and having transparent and opaque areas disposed in a predetermined arrangement. The plastic layer is then exposed to radiation passing through the master transparency to insolubilize those portions of the plastic layer lying adjacent to the transparent areas but not said opaque areas. Thereafter, the plastic area is washed to dissolve the portions of plastic layer which remain soluble to produce from the plastic layer the above described projections of uniform height having channels therebetween. Then the projections and channels defined by the photoinsolubilized plastic layer are overlaid with a diffusion membrane and the complete mass transfer device assembled.

The photopolymerizable material used in this invention can be any of a substantial number of nontoxic materials which are soluble and plastic prior to exposure to actinic light or other radiation, and which are insoluble and cross-linked after such exposure so that they retain their shape, although they may be elastomeric. Suitable photopolymerizable formulations can be prepared in accordance with any of the following patents: Plambeck, Jr. U.S. Pat. Nos. 2,760,863 and 2,791,504; Martin U.S. Pat. No. 2,902,365; Martin et al. U.S. Pat. No. 2,927,022; Barney U.S. Pat. No. 2,948,611; Saner et al. U.S. Pat. No. 2,972,540; Smith U.S. Pat. No. 3,012,952; Alles et al. U.S. Pat. No. 3,186,844; Clement et al. U.S. Pat. No. 3,173,787; Delzene U.S. Pat. No. 3,501,296; Floss et al. U.S. Pat. Nos. 3,516,828 and 3,512,971; and Millard U.S. Pat. No. 3,512,970; among others. In particular, highly suitable membrane supports can be prepared for use in the mass transfer devices of this invention by means of the Letterflex system, which is a proprietary printing plate manufacturing technique using equipment which is at the present time commercially available from W. R. Grace and Company, and is described in *Printing Plates Magazine*, Vol. 55, No. 5, May, 1969, pp. 3–10. The wellknown Dycril process of E. I. du Pont deNemours and Company can also be used.

In all of the above described systems, the particular membrane support of this invention can be made by overlaying a photoinsolubilizable plastic layer with a halftone or line master transparency of the type used in printing, typically of a 5 to 65 line screen with a value of 5 percent to 30 percent, or a transparency with parallel opaque lines with transparent portions therebetween, having a typical spacing between the lines of about 400 to 4,000 microns. The thickness of the photoinsolubilizable polymer is usually from 5 to 80 mils if mounted on a backing, such as Mylar brand oriented polyester, and substantially thicker if self-supporting. After the overlaying step, actinic light is directed through the halftone or line master transparency until the areas of photoinsolubilizable plastic underneath the transparent portions of the transparency have become insoluble to the desired depth, generally the full thickness of supported photopolymerizable films. The halftone or line master transparency is then removed, and the photopolymerizable layer is washed with an appropriate solvent to remove unpolymerized material, leaving a plurality of projections of uniform height corresponding to the transparent areas of the halftone or line master transparency. These projections are typically in the shape of truncated cones.

In the drawings, FIG. 1 is a plan view of a membrane support of this invention.

FIG. 2 is a detailed plan view of the membrane support of FIG. 1, showing the individual upstanding projections defined in the photoinsolublized plastic layer.

FIG. 3 is a highly detailed sectional view of the membrane support of FIG. 1 overlaid with a single thickness of semi-permeable diffusion membrane.

FIG. 4 shows a highly detailed sectional view of an alternative structure of the membrane support of this invention, in which upstanding projections are defined in both sides of the support by photoinsolubilized plastic layers.

FIG. 5 is a diagrammatic view showing how the photoinsolubilizable plastic layer is placed on a backing layer, overlaid with a master transparency, and exposed to actinic radiation.

FIG. 6 shows a detailed sectional view of an array of membrane supports cooperating with a plurality of semipermeable membrane tubings to provide a multipath dialysis apparatus, the supports and membrane tubings being vertically spread apart for clarification.

FIG. 7 shows a detailed sectional view of another array of membrane supports and semipermeable membranes the membrane support and membrane units being vertically spread apart for clarification.

FIG. 10 is an exploded view of another variety of mass transfer device in an intermediate stage of assembly.

FIG. 11 shows the mass transfer device of FIG. 10 laminated together and partially folded into an operative arrangement.

Figure 8:
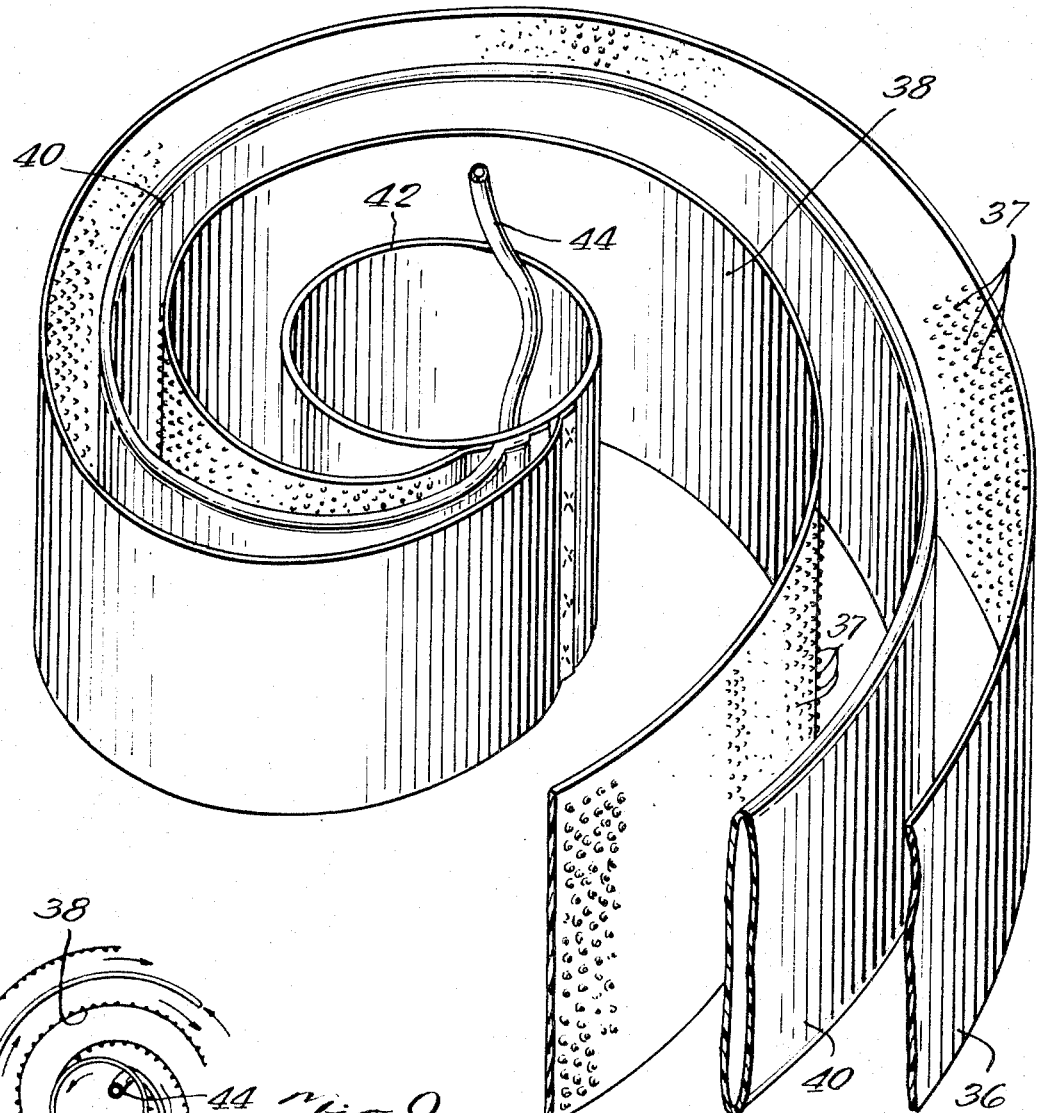
FIG. 8 shows a spiral arrangement of a pair of flexible membrane supports coiled together in a partially formed spiral with a length of tubular semipermeable membrane.

FIG. 12 discloses a schematic view of a multipath dialyzer, in which it is shown how an array similar to that shown in FIG. 6 can be manifolded to provide two independent flow paths for separate fluids through the apparatus.

Referring to FIGS. 1 through 3, a membrane support is shown in which flexible or rigid backing layer 2 carries supporting layer 4 which is made of photoinsolubilized plastic. Supporting layer 4 defines a plurality of projections 6, typically defining truncated cones. A diffusion membrane 8 overlies the supporting layer 4 and included cones 6, defining flow channels 10 passing between cones 6 and underneath membrane 8. Fluid for mass transfer can pass through flow channels 10 to intimately engage the lower side of membrane 8, while another fluid for mass transfer can flow against the upper side 9 of membrane 8.

If desired, a tubular membrane can be used in place of the single membrane 8 shown in FIG. 3.

While supporting layer 4 is shown to be continuous, including thin sections 5 of the supporting layers between projections 6, it is not necessary that these thin sections be present when there is a backing layer 2, but instead projections 6 can be entirely separate from each other, adhering to backing layer 2.

The membrane support of this invention can have a pair of lateral ridges 12, which are of the approximate height of the tops of cones 6. These ridges can be used, if desired, to seal the edges of the membrane support as several layers of membrane support are brought together in a stack, while still providing space for two separate flow paths on opposite sides of membrane 8.

Referring to FIG. 4, a structure is shown in which a pair of membrane supports are held together along line 14 in back-to-back relation to provide upstanding projections 6 on both sides of the new, assembled membrane support. This membrane support can also be made by two independent photopolymerization processes, each one performed on each side of a single, central backing layer 2, which carries two supporting layers of photoinsolubilized plastic.

Referring to FIG. 5, a schematic view of the process of making membrane supports is shown. Backing layer 14 is overlaid with a layer of photoinsolubilizable plastic 16 of a type described in the patents cited above, or used in the Letterflex or other commerical processes. The plastic layer 16 is rendered completely smooth by conventional means, such as by gravity settling or wiping with a mechanically operated wiper blade or roller. The plastic is then overlaid with a master transparency 18 in which the areas of plastic 19 which are to define the projections lie under transparent portions 19a of the master transparency 18, while the portions of the plastic layer 21 defining flow channels lie under opaque portions 21a of the master transparency 18. A light source 20 is shown shining through the master transparency 18 to irradiate and insolubilize only the portions 19 under transparent portions 19a, where the projections are desired. After complete irradiaition, the membrane support is washed with a suitable solvent to remove all of the plastic layer 16 which remains soluble (i.e., portions 21) to create the membrane support of this invention having projections of uniform height and flow channels of uniform dimension.

Referring to FIG. 6, a stack of membrane supports 13 similar to that shown in FIG. 4 is shown in which the respective membrane supports 13 are separated by tubular diffusion membranes 22. Conventional spacer means, such as ridge 12 (FIG. 1), can be used in conjunction with rigid backings 2 to prevent membrane supports 13 from collapsing inwardly against diffusion membrane tubes 22 to block off the flow. It can be seen that flow paths within each tube 22 is available for one type of fluid for mass transfer against another fluid percolating through the flow channels 24 defined in membrane supports 13.

Referring to FIG. 7, a stack of membrane supports 26, similar to the membrane supports shown in FIGS. 1 through 3, is arranged with single ply diffusion membranes 28 overlying the projections 30 of each membrane support 26. Each membrane 28 is folded around the back of each support 26, and pairs of supports 26 are arranged in back-to-back relationship, the pairs in turn forming a stack of diffusion members. This defines a multipath mass transfer device in which one fluid (e.g., blood) can pass between membranes 28 in path 32 defined therein while another fluid (e.g., dialyzate) can be manifolded into and out of area 34 between each respective membrane and its membrane support. The manifolding of the two fluids can be as shown in Belgian Pat. No. 742,666.

Alternatively, the same membrane support and a single ply membrane can be arranged as shown in German Gebrauchsmuster (Petty Pat.) No. 6,810,380.

Figure 9:
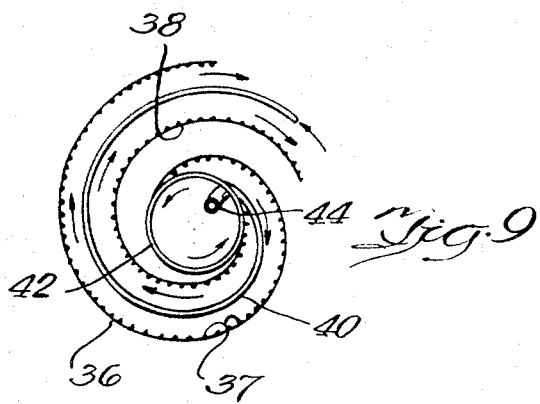
FIG. 9 is a transverse section of the spirally rolled device of FIG. 8, showing the respective arrangements of the membrane supports and tubular semipermeable membrane.

Referring to FIGS. 8 and 9, a spiral array is disclosed in which two strips of flexible membrane support 36, 38, each having projections 37 on only one side, are rolled together with a length of tubular dialysis membrane 40 about a core 42. Tube 44 is connected in the manner of conventional coil artificial kidneys to one end of the dialysis membrane 40, and another connection is placed at the other end of tube 40 (not shown) to form a kidney coil similar to those commercially available from Travenol Laboratories, Inc. under the trademark ULTRA FLO, but utilizing the novel membrane support described in this invention rather than the screening which is conventionally used.

Referring to FIGS. 10 and 11, an arrangement is shown similar to the device shown in U.S. Pat. application Ser. No. 825,348, filed May 16, 1969, now abandoned, in which a mass transfer device is made utilizing a convoluted membrane.

A single ply of membrane 44 is laid over a strip of membrane support 46 made from a photopolymerizable plastic layer in accordance with the description above, and having projections typically on only the side facing membrane 44. Membrane support 46, in turn, overlies a foldable backing 50 which is typicallly made of cardboard and which has preformed transverse score lines 52 to permit folding of the entire assembly in the manner shown in FIG. 11. Cutaway portions 54, 56 permit a fluid for mass transfer to pass through backing 50 to the upper side of membrane support 46 which presses against membrane 44. Membrane support 46 is generally sufficiently narrow so that it does not overlie cutaway portions 54, 56 to block flow.

Hence, when the assembly shown in FIG. 11 is moved from its partially convoluted configuration to a completely convoluted configuration (as shown in U.S. Pat. application Ser. No. 825,348), the folded structure can be manifolded to provide fluid flow paths through each of the convolutions 60 on one side of membrane 44, while also providing flow paths for another fluid for mass transfer on the other side of membrane 44 passing through convolutions 62 and cutaway portions 54, 56 to contact membrane 44.

FIG. 12 shows how a stack of membrane supports 13 and tubular membranes 22 similar to that shown in FIG. 6 can be placed in a container and manifolded to provide two separate flow paths for separate fluids. Inlet and outlet tubings 64, 66 provide fluids to ends 68 of the stack, in which fluid is allowed to pass inside each of the membrane tubings 22. The top tubing 22 is partly broken away to show its adjacent membrane support 13, while the usually present upper membrane support above top tubing 22 is not shown for purposes of clarity. Inlet and outlet tubings 70, 72 provice a cross-flow of another type of fluid which passes outside of the membrane tubings through the flow channels 24 defined by the projections 6 in the membrane supports, to provide contact by the two separate fluids with separate sides of the tubular diffusion membranes.

EXAMPLE 1

When membrane supports are made by the process described below, artificial kidneys of the type disclosed in FIGS. 6 and 12 can be fabricated. The chemical techniques used herein are disclosed in U.S. Pat. No. 2,927,022.

A mixture of 40 parts by weight of cellulose acetate (degree of acetate substitution: 1.63 substituents per monomer [Glucose] unit), 50 parts by weight of succinic anhydride, and 10 parts by weight of potassium acetate in 258 parts of dioxane is heated with stirring at 95° C. for about 18 hours. The reaction mixture is then poured with stirring into an excess of water, and the resultant solid product removed by filtration, washed with water, and dried.

A solution of five parts by weight of the above solid product, three parts by weight of triethylene glycol dimethacrylate, 0.1 part by weight of benzoin methyl ether, and 0.1 weight per cent of hydroquinone in about 10 parts by weight of a 90/10 volume ratio acetone/water mixture is cast on a flat polystyrene plate to form a uniform film 30 mils thick upon evaporation. The resulting film is overlaid with a master transparency which is a 27.5 line screen line transparency with a value of 20 percent. The resulting assembly is placed on a black antihalation background on a turntable rotating at about 4 rpm and exposed for about 15 minutes to the light from 4 to 75 watt RS type mercury vapor sunlamps suitably arranged at a distance of 12 to 14 inches.

The master transparency is then removed, and the film of polymer is washed with aqueous 1 percent sodium carbonate solution until all soluble polymer has been removed. The resulting structure constitutes the polystyrene plate with a plurality of uniformly distributed small truncated cones having a uniform height of 30 mils and being separated by a network of uniformly dimensioned channels. A plurality of such plates made from the same master transparency all exhibit precisely uniform dimensions, and can be assembled together in the manner indicated by FIGS. 6 and 12 into a dialysis apparatus.

EXAMPLE 2

Equivalent excellent results are obtained when polystyrene-backed membrane supports are fabricated in accordance with the Letterflex process of W. R. Grace & Company to form a layer of truncated cones on the polystyrene having a uniform height of 20 mils, said cones covering 8 percent of the surface area of said membrane supports, there being about 700 of said cones per square inch. Such membrane supports can be assembled with single ply Cuprophan dialysis membranes in the manner of FIG. 7 and Belgian Pat. No. 742,666. Equivalent alternate membrane supports can be fabricated on biaxially oriented polyester film by the Letterflex process using a 27.5 line screen halftone transparency with a 20 percent value as the master transparency, in which the resultant cones are 20 mils high. Such supports can be used in various dialyzer and oxygenator designs, such as the design shown in FIGS. 10 and 11.

EXAMPLE 3

When membrane supports are prepared by forming regularly spaced cones made of photopolymerized material on a backing of biaxially oriented poly(ethylene terephthalate) film in the manner described below, artificial kidney coils of the type described in FIGS. 8 and 9 can be prepared by coiling a pair of said membrane supports 36, 38 as shown with a tubular dialysis membrane 40.

The membrane supports can be prepared in accordance with the method of Example 1 of U.S. Pat. No. 2,927,022, with the exception that a 30 line screen halftone master transparency with a value of 10 percent is used in place of the line process negative, and that, as stated previously, the biaxially oriented polyester film is used rather than a glass plate. Furthermore, because the length of the membrane support is desirably about 15 feet, 10 clusters of four mercury vapor sunlamps each of the type described in Example 1 of U.S. Pat. No. 2,927,022 are distributed along the length of the 15 foot strip and arranged so that the clusters of sunlamps rotate to provide uniform irradiation of the surface.

EXAMPLE 4

When a membrane support consisting of uniformly distributed cones having a height of 12 mils is prepared by the use of a 20 line screen halftone master transparency with a 25 percent value on a flexible plastic film backing, the resulting product is suitable for use in oxygenators of the type disclosed in FIGS. 10 and 11.

Such membrane supports can be prepared in accordance with the following process, which is similar to a process described in U.S. Pat. No. 2,791,504. The flexible plastic backing is stretched on a table to absolute flatness, and a layer of the following formulation is applied as a film: A copolymer of vinyl chloride - vinyl acetate - maleic acid in a respective parts by weight ratio of 86/13/1, applied from a 20 percent solution of equal parts of xylene and methyl isobutyl ketone.

A photosensitive composition is then prepared by mixing 240 parts of methyl methacrylate and three parts of benzoin, and irradiating with ultraviolet light for about one hour to give a thin syrup. To this is added 60 parts of ethylene glycol dimethacrylate. A 12 mil layer of the resulting mixture on the prepared space is covered with the 20 line screen halftone master transparency with a 25 percent value. The transparency is protected from contact with the syrupy photopolymerizable layer by separating the transparency from the layer with a regenerated cellulose membrane.

The whole assembly is mounted on a horizontal turntable for irradiation by an RS type mercury vapor sunlamp, which is about 7 inches above the surface of the photopolymerizable polymer and slightly off center. With the turntable rotating at 4 rpm, the polymer layer is exposed through the master transparency for 10 minutes. After this, the negative is removed and the unpolymerized material removed by washing with an equal volume mixture of carbon tetrachloride and acetone. The resulting flexible membrane support exhibits uniformly spaced cones 12 mils in height which define uniformly dimensioned flow channels between them. The membrane support is typically laminated to cardboard backing 50 for ease of folding without damaging the cones.

The above specific disclosure is for illustrative purposes only, and is not to be construed as limiting the scope of the invention, which is defined in the claims below.

That which is claimed is:

1. A method of fabricating a device for mass transfer of fluids through a diffusion membrane carried by a flexible membrane support in nonplanar, three-dimensional configuration, which comprises:

preparing a flat, photoinsolubilizable plastic layer having a uniform thickness, said layer being flexible after being rendered insoluble;

overlaying said photoinsolubilizable plastic layer with a master transparency having transparent and opaque areas disposed in a predetermined arrangement;

exposing said plastic layer to radiation passing through said master transparency to insolubilize those portions of the plastic layer lying adjacent said transparent areas, but not said opaque areas;

washing said plastic layer to dissolve the portions of said plastic layer which remain soluble to produce from said plastic layer a plurality of projections of uniform height having channels therebetween; and thereafter overlaying said projections and channels with a diffusion membrane and moving said membrane and plastic layer into said nonplanar, three-dimensional configuration.

2. The method of claim 1 in which said projections are uniformly distributed upstanding protrusions having a height of 0.005 to 0.08 inch and covering from 5 to 30 per cent of the area of said membrane support, there being from 30 to 5,000 of said protrusions per square inch of said area.

3. The method of claim 2 in which said protrusions are in the shape of truncated cones.

4. The method of claim 3 in which said projections are 0.015 to 0.03 inch high, there being from 600 to 900 of said protrusions per square inch of said area.

5. The method of claim 4 in which said projections cover 5 to 20 per cent of the area of said membrane support.

6. The method of claim 5 in which said projections cover about 8 per cent of the area of said membrane support, said protrusions being about 0.02 inch high, there being about 700 to 800 of said projections per square inch of said area.

7. The method of claim 1 in which said diffusion membrane is a flattened tube, and said plastic layer and overlying diffusion membrane are moved into a spiral configuration about a core.

8. The method of claim 1 in which said plastic layer and overlying diffusion membrane are moved into a convoluted shape to define a plurality of fluid flow paths on each side of said diffusion membrane.

* * * * *